US008472921B2

(12) United States Patent
Yang et al.

(10) Patent No.: US 8,472,921 B2
(45) Date of Patent: Jun. 25, 2013

(54) APPARATUS, METHOD AND SYSTEM FOR REDUCED ACTIVE SET MANAGEMENT

(75) Inventors: Hong-Kui Yang, San Diego, CA (US); Shu Wang, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 216 days.

(21) Appl. No.: 12/704,794

(22) Filed: Feb. 12, 2010

(65) Prior Publication Data
US 2010/0210246 A1 Aug. 19, 2010

Related U.S. Application Data

(60) Provisional application No. 61/152,274, filed on Feb. 13, 2009.

(51) Int. Cl.
H04L 12/58 (2006.01)
H04M 11/00 (2006.01)
H04W 36/00 (2009.01)
H04W 4/00 (2009.01)

(52) U.S. Cl.
USPC ........ 455/412.1; 455/421; 455/436; 455/439; 455/442; 370/332; 370/331

(58) Field of Classification Search
USPC ............... 455/436–444, 41.2–41.3, 519–520, 455/524–525; 370/331–333
See application file for complete search history.

(56) References Cited

U.S. PATENT DOCUMENTS

| 6,049,716 | A   | * | 4/2000  | Jung ............................ 455/442 |
| 6,266,529 | B1  | * | 7/2001  | Chheda ......................... 455/436 |
| 6,353,602 | B1  | * | 3/2002  | Cheng et al. .................. 370/332 |
| 7,006,821 | B2  | * | 2/2006  | Tee ................................ 455/421 |
| 7,149,523 | B2  | * | 12/2006 | Schmidt et al. ............... 455/436 |
| 7,181,222 | B2  | * | 2/2007  | Thorson et al. ............... 455/442 |
| 7,548,759 | B2  | * | 6/2009  | Kim et al. ..................... 455/522 |
| 7,567,536 | B2  | * | 7/2009  | Czaja et al. ................... 370/332 |
| 7,567,781 | B2  | * | 7/2009  | Chen et al. ...................... 455/69 |
| 7,609,676 | B2  | * | 10/2009 | Welnick et al. ............... 370/331 |
| 7,643,452 | B2  | * | 1/2010  | Grilli et al. .................... 370/331 |
| 7,756,084 | B2  | * | 7/2010  | Deng et al. .................... 370/332 |
| 7,937,086 | B2  | * | 5/2011  | Chen et al. .................... 455/437 |
| 7,983,674 | B2  | * | 7/2011  | Julian et al. ................... 455/436 |
| 8,023,950 | B2  | * | 9/2011  | Malladi et al. ................. 455/442 |
| 2001/0016497 | A1 | * | 8/2001  | Al-Housami .................. 455/452 |
| 2002/0045443 | A1 | * | 4/2002  | Hunzinger ..................... 455/421 |
| 2002/0071403 | A1 | * | 6/2002  | Crowe et al. .................. 370/331 |
| 2002/0111158 | A1 | * | 8/2002  | Tee ................................ 455/421 |
| 2003/0036384 | A1 | * | 2/2003  | Chen et al. .................... 455/437 |
| 2003/0060201 | A1 | * | 3/2003  | Soliman ....................... 455/442 |
| 2004/0037246 | A1 | * | 2/2004  | Grilli et al. .................... 370/331 |
| 2004/0121770 | A1 | * | 6/2004  | Tigerstedt et al. ............ 455/436 |

(Continued)

Primary Examiner — Dwayne Bost
Assistant Examiner — Scott Trandai
(74) Attorney, Agent, or Firm — Richard K. Huffman; James W. Huffman

(57) ABSTRACT

A first communication device wirelessly coupled to a second communication device. The first communication device includes a first receiver, a message processor, and a first transmitter. The first receiver is configured to receive first signals corresponding to a first number of communication devices, where the second communication device is one of the communication devices, and is also configured to measure first strengths of the first signals. The message processor is configured to determine that a second number of the communication devices can be processed by the first communication device according to the first strengths measured. The first transmitter is configured to transmit one or more first messages to the second communication device indicating the second number.

19 Claims, 6 Drawing Sheets

VARIABLE ACTIVE SET MANAGEMENT

U.S. PATENT DOCUMENTS

| | | | |
|---|---|---|---|
| 2005/0201331 A1* | 9/2005 | Gaal et al. | 370/332 |
| 2006/0148480 A1* | 7/2006 | Thorson et al. | 455/442 |
| 2007/0015512 A1* | 1/2007 | Hunzinger | 455/439 |
| 2007/0191044 A1* | 8/2007 | Kostic et al. | 455/522 |
| 2007/0201407 A1* | 8/2007 | Borran et al. | 370/335 |
| 2007/0218909 A1* | 9/2007 | Deng et al. | 455/442 |
| 2007/0243871 A1* | 10/2007 | Chen et al. | 455/436 |
| 2007/0254658 A1* | 11/2007 | Fabien et al. | 455/436 |
| 2009/0093252 A1* | 4/2009 | Czaja et al. | 455/436 |
| 2010/0120433 A1* | 5/2010 | Grilli et al. | 455/436 |
| 2010/0227615 A1* | 9/2010 | Gaal et al. | 455/436 |

* cited by examiner

FIXED ACTIVE SET MANAGEMENT

DUAL ACTIVE SET MANAGEMENT

*METHOD FOR A MOBILE STATION TO CHANGE THE ACTIVE SET*

APPARATUS, METHOD AND SYSTEM FOR REDUCED ACTIVE SET MANAGEMENT

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61152274 (VTU.09-0023-US) | Feb. 13, 2009 | REDUCED ACTIVE SET MANAGEMENT FOR CDMA2000 FUNDAMENTAL CHANNELS |

BACKGROUND OF THE INVENTION

1. Field of the Invention

This invention relates in general to the field of microelectronics, and more particularly to an apparatus and method for improving performance in a mobile telecommunications system that utilizes code division multiple access as the underlying communications method.

2. Description of the Related Art

The cell phone industry is undergoing exponential growth, not only in the this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems prevalently employed frequency division multiple access (FDMA) as the modulation strategy. One well known example of this technology is Global System for Mobile Communications (GSM), in which a particular cell phone communicates with its base station within a given cell over a specific frequency channel. In order for that cell phone to communicate with a base station in an adjacent cell, it must be assigned a new frequency channel and the switch coordinated in time with the old base station, the new base station, and the cell phone itself. This type of handoff from one cell to the next is known as a hard handoff.

Currently, so-called "3G" or third generation cellular communications technologies are being developed. These technologies are not characterized so much by modulation techniques, but more so by performance metrics (e.g., 2 Megabits per second indoor data rates, 384 Kilobits per second outdoor data rates). As such, there are presently a number of diverse approaches being proposed for 3G.

In the interim, a number of hybrid technologies are being provided, known as "2.5G" techniques and protocols, one of which is CDMA2000 1x. This system utilizes spread spectrum code division multiple access (CDMA) techniques to multiplex many move users over a single frequency channel that can be attained through the use of current FDMA systems. Under CDMA, the same frequency channel is used to communicate with all of the mobile stations within a group of adjacent cells and signals to and from the mobile stations are uniquely encoded using orthogonal codes.

Since the same frequency channel is used by adjacent base stations, this allows multiple base stations to provide for communications with a single cell phone, and as such, the phone is able to gracefully transition from one cell to the next. That is, two or more base stations in adjacent cells may be communicating with a single cell phone where their coverage areas overlap, but only one base station is designated as primary controller for the mobile station. As handoff to the next cell is coordinated between the base stations and the mobile station, it is realized often times in a coordinated change of designation within the cell phone itself. That is, rather than a "hard" switch from one frequency channel to the next, a "soft" switch is affected when the cell phone designates a base station with which it is currently communicating as its new primary base station.

In addition to the advantages of cell handoff, processing gains within a mobile station's receiver can be achieved when multiple delayed copies of the same traffic signal are received from two or more base stations. As one skilled in the art will appreciate, so-called macro diversity combining within a mobile station receiver can ideally result in an overall increased signal-to-noise ratio within the receiver itself, thus providing for an overall improvement in reception.

The above advantages notwithstanding, the present inventors have observed that there are several problems and limitations to current approaches, which are most notably seen when these ideal concepts are applied to real-world devices. One problem results from the fact that all base stations within a given area utilize the same frequencies to communicate. While conceptually a better estimation of signal content can be made when there are more signals received that carry the same information, a practical cell phone does not provide the receiver quality and processing capacity to address more than a certain number of signals and thus, any signals that are weak (due to distance between a far base station and a given mobile, for example) become difficult to process and, when they drop below a given signal-to-noise ratio, they actually function as interference. As has been observed, these delayed copies and weak transmissions from far base stations, rather than contributing to the overall reception quality of a mobile station within the network, have become problematic sources of interference, particularly when the mobile station transitions from one cell to the next.

The present inventors also have noted that prevailing protocols extant in the art (e.g., CDMA2000) provide no flexibility whatsoever for a mobile station to directly influence either the number or designation of base stations that are transmitting traffic signals that have to be processed by the mobile station and, consequently, the concept of macro diversity combining is not fully exploited under practical situations where different mobile phones exhibit differing capabilities.

Therefore, what is needed is an apparatus and method whereby weak signals from either far base stations or multipath sources can be identified and precluded by varying the number of base stations that are actively transmitting traffic to a given mobile station.

In addition, what is needed is a mechanism in both mobile stations and base stations that allows for more efficient utilization of resources by varying the number of base stations that are actively transmitting traffic to a given mobile station and by varying the number of base stations that are employing macro diversity combining to receive traffic from the mobile station.

Also what is needed is a technique whereby a mobile station can directly determine the number base stations that are transmitting traffic so that the number can be reduced to improve performance at the mobile station.

SUMMARY OF THE INVENTION

The present invention, among other applications, is directed to solving the above-noted problems and addresses other problems, disadvantages, and limitations of the prior art. The present invention provides a superior technique for improving the performance of a CDMA-based telecommunications system. In one embodiment, a first communication device wirelessly communicating with a second communication device is envisioned. The first communication device includes a first receiver, a message processor, and a first transmitter. The first receiver configured to receive a plurality of first signals from said plurality of second devices. The message processor, configured to determine a first set of the plurality of second devices, wherein the message processor determines the size of the first set and which second device is selected into the first set according to a measurement of the plurality of first signals; and the first transmitter, configured to transmit one or more first messages to the second device in the first set of the plurality of second devices.

One aspect of the present invention contemplates a method for wirelessly communicating between a first communication device and a second communication device. The method includes receiving a plurality of first signals corresponding to said plurality of second devices, determining the size of a first set of the plurality of second devices and which second device is selected into the first set according to a measurement; and transmitting one or more first messages to the second device in the first set of the plurality of second devices.

Another aspect of the present invention comprehends a system. The system has a plurality of second devices for transmitting a plurality of first signals and a first device, The first device communicating with the plurality of second devices, the first device further comprising a first receiver, a message processor and a transmitter. The first receiver, configured to receive the plurality of first signals corresponding to said second devices; The message processor, configured to determine a first set of the plurality of second devices, wherein the message processor determines the size of the first set and which second device is selected into the first set according to the measurement; and the first transmitter, configured to transmit one or more first messages to the second device in the first set of the plurality of second devices.

Regarding industrial applicability, the present invention may be implemented within one or more integrated circuits within a cellular communications device, such as a mobile station (i.e., cell phone) or base station.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
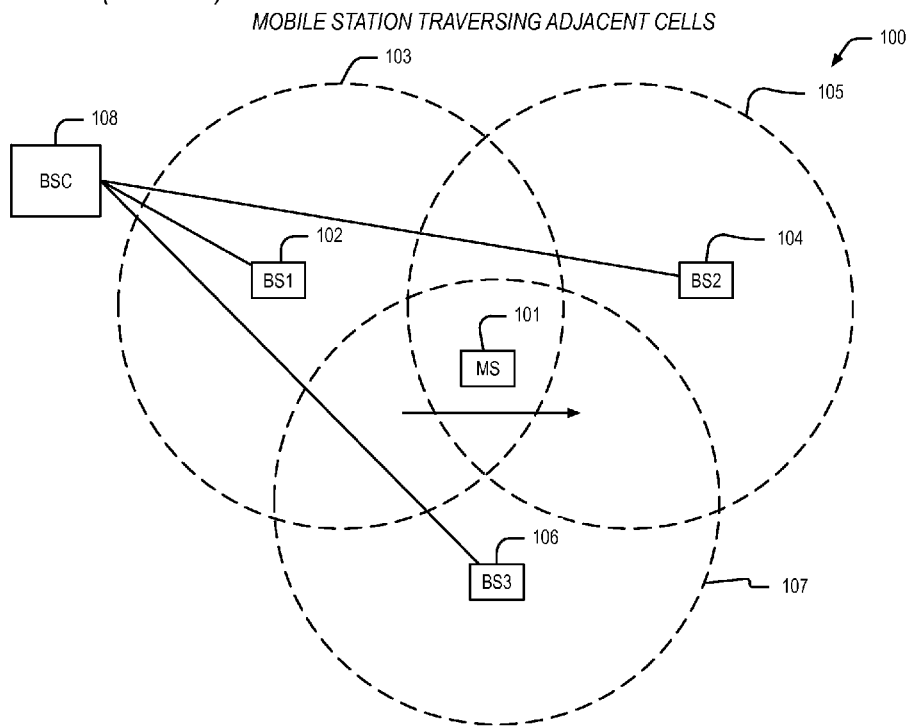
FIG. 1 is a block diagram illustrating a mobile station traversing through three cellular coverage areas.
Figure 2:
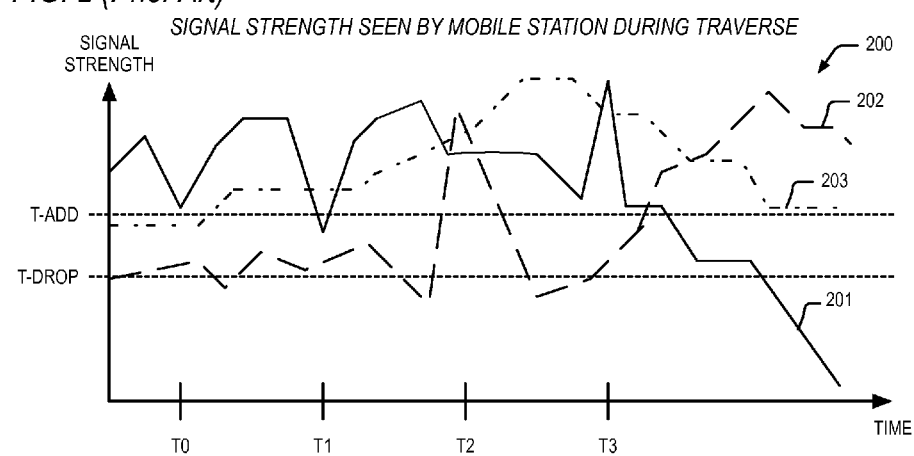
FIG. 2 is a timing diagram depicting the strength of respective signals received by the mobile station of FIG. 1 as it traverses through the cellular coverage areas.
Figure 3:
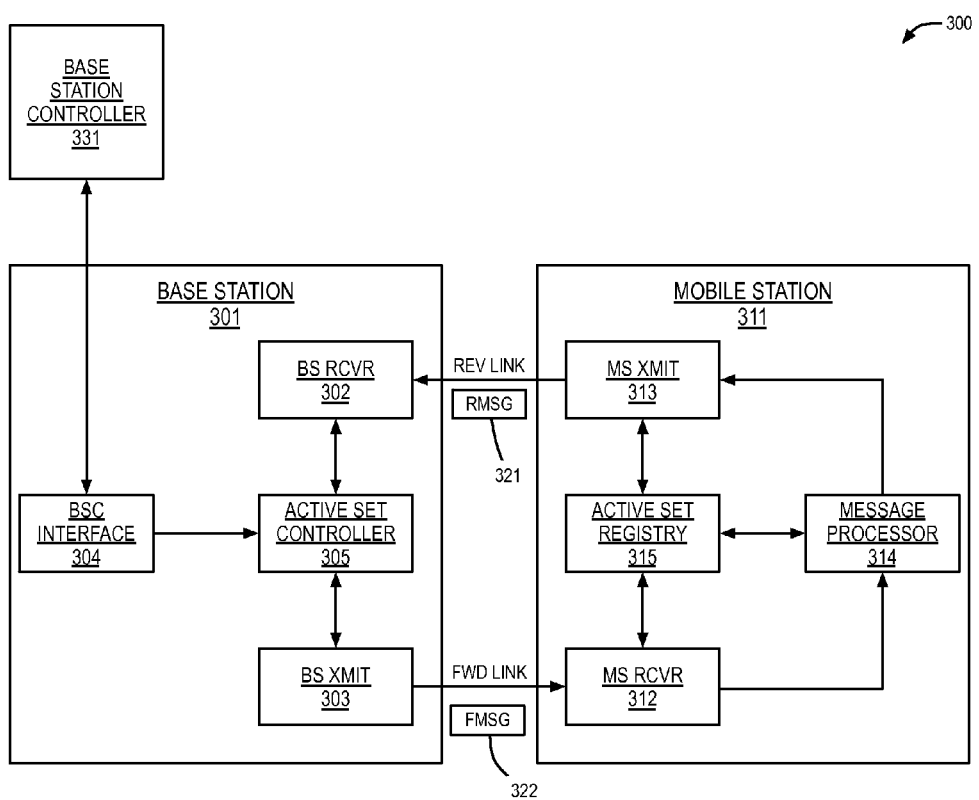
FIG. 3 is a block diagram featuring a present day wireless communication system that utilizes multiple base stations within an active set to improve overall reception and reception under handoff conditions.

In view of the above background discussion on CDMA-based telecommunications and associated techniques employed within cell phone systems to improve reception using macro diversity combining techniques a discussion of the problems inherent in the present day approach will now be presented with reference to FIGS. 1-3. Following this discussion, a detailed disclosure of the present invention will be presented with reference to FIGS. 4-6. The present invention overcomes the limitations of existing combining approaches by providing a technique that allows for significant improvements in interference reduction, channel resource availability, and voice capacity. The mechanism according to the present invention is furthermore adaptable to various mobile station and base station embodiments which have differing processing capabilities.

Turning to FIG. 1, a block diagram 100 is presented illustrating a mobile station 101 traversing through three cellular coverage areas 103, 105, 107. Cellular signals are received from and transmitted to the mobile station 101 by three base stations 102, 104, 106, where the strength of the respective transmitted and received signals is a function of the location of the mobile station 101 at it traverses through the cellular coverage areas 103, 105, 107. The particular number of base stations 102, 104, 106 and their respective cells 103, 105, 107 is shown for illustrative purposes only. As one skilled in the art will appreciate, the number of cells 103, 105, 107 within which a particular mobile station 101 falls is a function of the mobile station's location and the deployment pattern of the base stations 102, 104, 106. The three base stations 102, 104, 106 are each coupled via a hard-wired connection to a base station controller 108.

As is alluded to above, CDMA techniques allow for significant increases in user capacity over formerly employed techniques such as Global System for Mobile Communications (GSM), which utilizes frequency division multiple access (FDMA) as its principal access technology. Although the mobile station 101 is shown in the block diagram 100 at the intersection of the three cells 103, 105, 107, it is noted that the mobile station 101, as a function of its location, may only be serviceable by a single cell 103, 105, 107, or by numerous cells 103, 105, 107 up to the mobile station's capacity to process respective signals.

Under GSM a mobile station cannot simultaneously communicate with more than one base station because individual base stations utilize different frequencies to communicate with mobile stations. Accordingly, when the signal reception at a GSM mobile station drops below an acceptable threshold, the mobile station sends a request through its corresponding base station requesting that it be handed off to another base station having a stronger signal. To accomplish the handoff, the mobile station is directed to change its transmit/receive frequencies to those associated with the new servicing base station and the new base station was instructed to provide for communications continuity.

The above GSM example is known as a hard handoff. This is because there is no overlap of coverage under FDMA. Even though a mobile station 101 may be located as is shown in the block diagram 100 such that it is possible to receive and transmit signals to multiple base stations 102, 104, 106, in practice the mobile station 101 cannot do so under GSM because the mobile station 101 does not possess the capability to simultaneously communicate over multiple frequency channels. It can only transmit and receive on one frequency channel at a time.

Under CDMA, however, all communications between a mobile station 101 and any base station 102, 104, 106 within a cellular network utilize the same frequency channel, and thus the mobile station 101 is capable of decoding and utilizing signals from any base station 102, 104, 106 to which it is assigned by a base station controller 108. As one skilled in the art will appreciate, it is present day practice to assign up to approximately six active base stations 102, 104, 106 to simultaneously communicate with any given mobile station 101, depending upon its location relative to the base stations 102, 104, 106. These active base stations 102, 104, 106 are known to the mobile station 101 as an "active set" and, in coordination with the base station controller 108, messages are exchanged between the mobile station 101 and the base stations 102, 104, 106 to change the base stations 102, 104, 106 within its active set as reception conditions change within the network in order improve reception of signals by both the mobile station 101 and by the base stations 102, 104, 106, and also to improve the capability to hand off the mobile station 101 to new base stations (not shown) as the mobile station continues movement.

Although as many as six base stations 102, 104, 106 may be assigned to the active set for the mobile station 101, only one of the base stations 102, 104, 106 is designated as the primary, or servicing base station. All of the base stations 102, 104, 106 within the active set provide pilot and traffic signals to the mobile station 101, however, only the servicing base station provides control information to the mobile station 101, such as the adding or deleting base stations from its active set. These assignments are made in coordination with the base station controller 108 and are coordinated via specific protocol with each of the base stations 102, 104, 106 and the mobile station 101. In addition, it is noted that the maximum number of base stations 102, 104, 106 in the active set (currently six) is a function of the CDMA protocol, and is driven by the capacity of the cellular network. As noted, the mobile station 101 receives traffic channels (i.e., data and voice information) from all the base stations 102, 104, 106 in its active set. Control information is received from and provided to the serving base station only. To aid in reception, the mobile station 101 monitors pilot signals from all base stations 102, 104, 106 in its active set as well as other base stations (not shown) in the network to determine if they are simply neighbors (i.e., likely contenders for providing quality signaling, but whose signal strength is not yet sufficient) or candidates (i.e., base stations having signal strengths sufficient to be placed within the active set). It is beyond the scope of the present application to provide an in-depth tutorial on active sets, candidate sets, neighbor sets, and remaining sets and how such are employed to provide for optimum communications over a CDMA network. However, it is sufficient to note that present day systems employ an active set which is capped at six base stations in size and whose contents are not determined by the mobile station 101.

When the signal quality from a particular base station in the active set becomes stronger than that of the serving base station, then the mobile station 101 requests that the particular base station be designated as its serving base station. And since the mobile station 101 has been and is continuing to receive signals from all the base stations 102, 104, 106 in its active set, the change in designation of the serving base station is somewhat transparent to an ongoing call. This is known as a soft handoff or soft handover. In contrast to a hard handoff where an entire frequency channel is changed, a soft handoff occurs simply by change in designation within the mobile station's active set. Messages are sent by the mobile station 101 indicating the relative strengths of the pilot signals and control messages are returned to the mobile station 101 designating the servicing base station and adding and deleting base stations from the active set.

Each of the base stations 102, 104, 106 employs a specific pseudo-random code, or "long code" to modulate traffic, paging, and signaling information to the mobile station 101, however, as one skilled in the art will appreciate, these long codes are simply time shifted versions of a master pseudo-random code, where the time shift is known as an offset.

The mobile station 101 must deal with the effects of multipath, that is, delayed arrival of signals from each of the base stations 102, 104, 106 which have been reflected or refracted as a function of signal path and environment. And a typical CDMA-based mobile station 101 will utilize a rake receiver (not shown) to demodulate the desired channel (e.g., traffic channel or pilot channel) in its receiver input by despreading each received individual signal (also known as a "branch" or "finger") with the corresponding codes assigned to the mobile station and base station, typically known as Walsh codes and short PN (i.e., "pseudo-random) codes. Because the mobile station 101 receives the signals transmitted from the base stations 102, 104, 106 through several paths with different propagation delays, the received signals, in addition to being corrupted by noise, are also distorted by the channel fading. The rake receiver is employed within a CDMA-based mobile station 101 to use the direct-sequence spreading of the coded signal to separate the components of the received signal corresponding to different propagation-delay paths. Analogous in result to the use of frequency diversity in FDMA systems, the use of a rake receiver to derive diversity gain from a potentially poor channel in a CDMA communications system is referred to as macro diversity. After rake receiver despreading, a demodulation routine detects the transmitted data from each delayed-path components and combines the results to preferably yield a received signal having a higher quality that would otherwise be attainable.

Since the signal transmitted by a given base station 102, 104, 106 is merely an offset version of the same signal transmitted by any other base station 102, 104, 106, the technique of macro diversity is extended in a present day mobile station 101 beyond the level of fading to include the combination of signals from multiple base stations 102, 104, 106, which in the optimum result in improved system performance.

It is beyond the scope of the present application to provide an in-depth description of CDMA-based communications and access mechanisms that provide for communication over a CDMA-based cellular, or radio, network such as CDMA 2000 or IS-95. However, it is sufficient to note that, regardless of protocol or type of modulation scheme provided for by a particular CDMA-based communications network, macro diversity techniques (e.g., rake receivers employing multiple diversity branches to combine signals) will almost certainly be utilized to enable processing gains.

The preferred receiver for performing macro diversity combining is the maximum ration combiner (MRC) whose signal-to-noise ratio (SNR) is the sum of the SNRs of each individual diversity branch if the receiver is able to properly track and combine each individual branch. In theory, the MRC is optimal under these conditions. However, as one skilled in the art will appreciate, ideal mathematical conditions often are compromised when real-world devices having limited processing capabilities are built.

Consider that when one diversity branch (i.e., a received signal) has a low SNR, which is less than a certain threshold, its contribution to the diversity combining output become very limited and depending upon processing capabilities of the receiver, may indeed function as interference. For example, a receiver within a mobile station 101 may be limited in processing resources devoted to accurately tracking the timing of a larger number of branches, thus making it difficult to accurately calculate the combining weights for them. As one skilled in the art will appreciate, present day mobile devices 101 employ a less than ideal MRC, which usually combines the diversity branches of those signals within their active sets whose SNRs are above a certain threshold.

The present invention is directed towards overcoming limitations in a CDMA-based wireless radio or telecommunications system as will be described in further detail herein below. The well known IS-95 (i.e., CDMA 2000) packetized protocol will be utilized to teach aspects of the present invention because this protocol is widely recognized, however, the present inventors note that the techniques provided for by the present invention extend beyond IS-95 to any other protocol or system of communications where macro diversity principles are employed to combine signals from multiple base stations 102, 104, 106 in order to yield a higher quality received signal within a given mobile station 101.

Reference is now made to FIG. 2, where a timing diagram 200 is presented depicting the strength of respective signals 201-203 received by the mobile station of FIG. 1 as it traverses through the cellular coverage areas 103, 105, 107. For purposes of this example, consider that signal 201 is the pilot signal 201 corresponding to base station 1 102, signal 202 is the pilot signal 202 corresponding to base station 2 104, and signal 203 corresponds to base station 3 106. Regarding strength of the signals 201-203, two thresholds are shown in the diagram 200, T-ADD and T-DROP, which are commensurate with those thresholds employed within a CDMA2000 system, albeit simplified for purposes of teaching the present invention. These thresholds are employed by the mobile station 101 to determine when a request should be sent to the servicing base station 102, 104, 106 to either add a base station to the active set (i.e., T-ADD) or to drop a base station from the active set (i.e., T-DROP).

Now consider that the mobile station 101 is at the far left edge of the cell 103 corresponding to base station 1 102. Thus, as one skilled in the art will appreciate, the relative signal strengths of each of the three received signals 201-203 would be as is shown at time T0 in the timing diagram 200. That is, because the mobile station 101 is at the far left of the diagram 100, it is closer to base station 1 102, and thus would receive a stronger signal 201 from base station 1 102. Next in order of proximity is base station 3 106, whose signal 203 is shown as being weaker than the signal 201 of base station 1 102, but which is stronger than the signal 202 corresponding to base station 2 104, because base station 2 104 is farthest from the mobile station 101. Assume that at time T0, the mobile station 101 is not in soft handoff because only base station 1 102 is transmitting a signal 201 whose strength is sufficient to be in the active set, that is, the strength of signal 201 is greater than T-ADD.

It is the general expectation that the relative strengths of each of the signals 201-203 would persist in order at time T1 when the mobile station 101 is, say, closest to base station 1 102. However, because of the constantly changing nature of the transmission environment associated with cellular communications, the relative strengths of the signals 201-203 at time T1 shows signal 203, which corresponds with base station 3 106 as being weaker than signal 201. And signal 203 is greater than T-ADD, and is it assumed that base station 3 106 is added to the active set, thus allowing for macro diversity combining of traffic signals from base station 1 102 and base station three 106.

Consider also at time T1 that base station 2 104 is also in the mobile station's active set, yet the strength of signal 202 is below T-ADD. As alluded to above, depending upon the specific processing capabilities of the mobile station 101, signal 202 may very well be seen as interference because its SNR is low.

And at time T2, when the mobile station 101 is closes to base station 3, because of sporadic conditions due to antenna deployment and transmission effects, signal 202, which is associated with base station 2 104, is strongest. Likewise, at time T3, when the mobile station 101 is closest to base station 2 101, because of these same conditions, signal 201 is momentarily strongest.

The timing diagram 200 of FIG. 2 is presented to introduce the problems that have been observed by the present inventors associated with macro diversity combining in those mobile stations 101 that may have differing processing capabilities. As noted above, while it is theoretically advantageous that more branches of the same signal (as represented by signals 201-203) will add to the overall quality of reception for a particular mobile station 101, the present inventors have observed that there are practical considerations associated with the design and production of receivers within a present day mobile station 101. For example, in a practical mobile station any branch 201-203 whose SNR is below T-ADD, as is shown in the timing diagram 200, may essentially add noise to the receiver. That is, when the strength of a received signal 201-203 (or any delayed copies) is below the threshold, T-ADD, that signal 201-203 becomes a source of interference rather than a source for macro diversity.

Consequently, consider at times T0, T1, and T3 when the strength of signal 202 is below the threshold, T-ADD. Rather than contributing to reception, and furthermore determination of optimum conditions for soft handoff in the mobile station 101 at these times, the signal 202 from base station 2 104 is actually interfering because it's signal-to-noise ratio (SNR) is low. And the present inventors have observed that too many low SNR diversity branches is detrimental under real world conditions because of the extra load on the communications system that is incurred due to the increase in the number of channels occupied and reserved for macro-diversity combining of pilot signals 201-203.

Yet, with a fixed active set size which is not under the control of the mobile station 101, the present techniques for performing normal reception and reception under soft handoff conditions is actually limiting since there may be base stations 102, 104, 106 assigned to fill up the entries in the active set where the processing capacity of the mobile station 101 is actually exceeded in terms of tracking the timing of low SNR signals 201-203. The present inventors have also noted that assigning too many mobile stations in to base stations 102, 104, 106 within a given network may actually block the admission of new traffic and may decrease the actual user capacity of a given system. Furthermore, maximizing the number of base stations 102, 104, 106 within a given mobile station's active set increases transmission power of the base stations 102, 104, 106 and thus results in more interference to adjacent cells in the network.

Turning now to FIG. 3, a block diagram is presented featuring a present day wireless communication system 300 that utilizes multiple base stations within an active set to improve overall reception and reception under handoff conditions. The system 300 includes a base station controller 331 that is coupled to a primary base station 301. The primary base station 301 is coupled to a mobile station 311 via both a wireless forward link over which is transferred forward link messages 322 from the base station 301 to the mobile station 311, and a wireless reverse link over which is transferred reverse link messages 321 from the mobile station 311 to the base station 301. As one skilled in the art will appreciate, the system 300 of FIG. 3 is simplified for clarity purposes in order to teach significant aspects of the present invention. In addition, for clarity purposes, only the primary base station 301 is depicted, however, it is noted that signals are being transmitted to the mobile station 311 by other base stations (not shown) within the mobile station's active set, as is described above, where the signals from these other base stations exhibit SNRs which are advantageous or detrimental to reception and soft handoff in keeping with the processing capabilities of the mobile station 311.

The base station 301 includes a base station controller interface 304, which is coupled to an active set controller 305. The base station 301 also includes a base station receiver 302 that is coupled to the reverse link for reception of reverse link messages 321 and that is also coupled to the active set controller 305. The base station 301 additionally has a base station transmitter 303 that is coupled to the active set controller 305 and that transmits forward link messages 322 over the forward link.

The mobile station 311 has a mobile station receiver 312 that receives forward link messages 322 over the forward link. The mobile station receiver 312 is coupled to an active set registry 315 and to a message processor 312 within the mobile station 311. The message processor 314 is coupled to the active set registry 315 and to a mobile station transmitter 313, which transmits reverse link messages 321 over the reverse link to the base station 301.

In operation, when the base station controller 331 originally assigns a forward traffic channel to the mobile station 311, a particular base station 301 is assigned as the primary base station 311 and this information is communicated to the primary base station 301 by the base station controller 331 along with those other base stations which are to be placed in the mobile station's active set. Accordingly, the base station controller interface 304 receives these designations and establishes the contents of the mobile station's active set within the active set controller 305. As one skilled in the art will appreciate, a typical present day base station 301 has an active set controller 305 that maintains the contents of a plurality of active sets which correspond to a plurality of mobile stations within the base station's coverage area, as designated by the base station controller 331.

Accordingly, the base station 301 communicates the base stations for the active set corresponding to the mobile station 331 over the forward link by one or more forward link messages 322. In a CDMA2000 system, this information is passed to the mobile station via a channel assignment message. Subsequent updates to the content of the active set are sent using handoff direction messages.

The mobile station 311 receives these messages 322 over the forward link and the mobile station receiver 312 provides the active set information to the active set registry 315. As subsequent traffic is received, the receiver 312 accesses the active set registry 315 for purposes of measuring pilot signal strength in order to request that base stations be added or dropped from the active set, and for purposes of combining traffic signals within the receiver 312 to achieve macro diversity combining.

Processed traffic and signal strengths are provided to the message processor 314, which generates data to be transmitted to the primary base station 301. The message processor 314 accesses the active set registry 315 as well to correlate data received from the receiver 312 with the base stations in the active set, and also to format acknowledgements, traffic, and requests to add/drop base stations from the active set for transmission to the primary base station 301. The transmitter 313 formats and transmits the reverse link messages 321 to the primary base station 301 using the information contained in the active set registry 315. As alluded to above, when it is determined that a base station should be dropped from the active set by signal strength measurements made in the receiver 312 (e.g., signal strength falls below T-DROP for a period of time defined by protocol), then the message processor 314 queues up reverse link messages 321 for transmission to the base station 301 requesting that designated base stations be added or dropped from the active list. In a CDMA2000 system, these messages are called pilot strength measurement messages (PSMMs, Pilot Strength Measurement Message).

The primary base station 301 receives the messages 321 requesting modification of the active set for the mobile station 311, and in coordination with the other base stations (via the base station controller 331), the active set is changed within the active set controller 305 and forward link messages 322 are transmitted to the mobile station 311 directing the mobile station 311 to modify the contents of its active set registry 315 to add/drop base stations or to perform a handoff.

It is important to note that a present day wireless system 300 utilizes a fixed size active set that cannot be changed at the discretion of the mobile station 311. In a CDMA2000 system, this fixed size is six entries. And the mobile station 311, according to protocol, can only request that a base station be added or dropped from the active set. Consequently, a present day system 300 is limited in performance, both in mobile station reception and in soft handoff from the perspective of both the mobile station 311 and base station 301. Limitations result from an increased burden on the mobile station 311 to process noisy signals associate with some of the base stations within the active set and also from resources within the base station 301 and base station controller 331 which much be committed to perform soft handoff in a complex signal environment, thus precluding the use of additional processing resources therein to handle additional users. Present day systems are also limited in that there are additional noisy transmissions from surrounding base stations, which causes interference in adjacent cells.

In another aspect, the present inventors have also noted the imbalance in receiver capability between a receiver 302 in a base station 301 versus a receiver 312 in a mobile station. Moreover, they have observed that the processing capabilities in a base station 301 are far superior to processing capabilities within the mobile station 311. Yet, the current fixed active set size which cannot be directly modified by a mobile station 311 does not address these imbalances in a manner that actually improves performance and throughput of the system 300.

The present invention overcomes the above noted limitations and disadvantages of a present day wireless communication system by providing apparatus and methods that employ variable sized active sets which, in some embodiments, can be directly modified in content and size by a mobile station itself, thus more efficiently utilizing the unique processing and signal reception capabilities of each mobile station. The present invention will now be discussed with reference to FIGS. 4-6.

Figure 4:
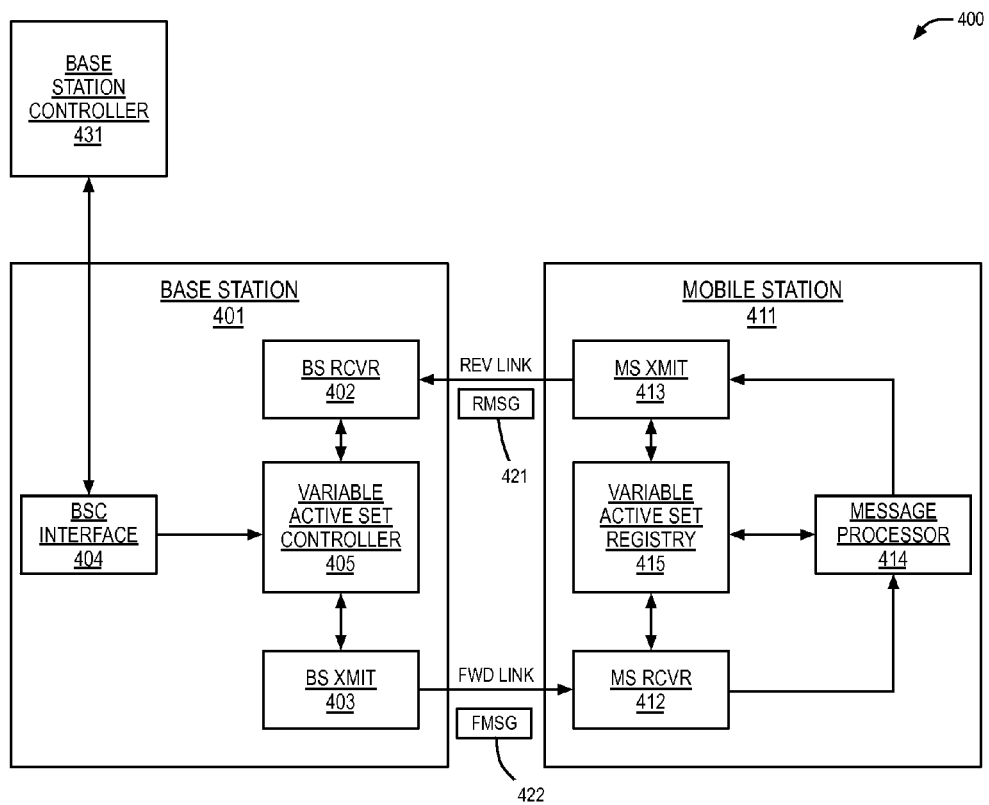
FIG. 4 is a block diagram showing a wireless communication system according to the present invention that employs variable active set management.

Turning now to FIG. 4, a block diagram is presented showing a wireless communication system 400 according to the present invention that employs variable active set management. The system 400 includes a base station controller 431 that is coupled to a primary base station 401. The primary base station 401 is coupled to a mobile station 411 via both a wireless forward link over which is transferred forward link messages 422 from the base station 401 to the mobile station 411, and a wireless reverse link over which is transferred reverse link messages 421 from the mobile station 411 to the base station 401. As one skilled in the art will appreciate, the system 400 of FIG. 4 is simplified for clarity purposes in order to teach significant aspects of the present invention. In addition, for clarity purposes, only the primary base station 401 is depicted, however, it is noted that signals are being transmitted to the mobile station 411 by other base stations (not shown) within the mobile station's active set, as is described above, where the signals from these other base stations may exhibit SNRs which are advantageous or detrimental to reception and soft handoff in keeping with the processing capabilities of the mobile station 411.

The base station 401 includes a base station controller interface 404, which is coupled to a variable active set controller 405. The base station 401 also includes a base station receiver 402 that is coupled to the reverse link for reception of reverse link messages 421 and that is also coupled to the variable active set controller 405. The base station 401 additionally has a base station transmitter 403 that is coupled to the variable active set controller 405 and that transmits forward link messages 422 over the forward link.

The mobile station 411 has a mobile station receiver 412 that receives forward link messages 422 over the forward link. The mobile station receiver 412 is coupled to a variable active set registry 415 and to a message processor 412 within the mobile station 411. The message processor 414 is coupled to the variable active set registry 415 and to a mobile station transmitter 413, which transmits reverse link messages 421 over the reverse link to the base station 401.

In operation, when the base station controller 431 originally assigns a forward traffic channel to the mobile station 411, a particular base station 401 is assigned as the primary base station 411 and this information is communicated to the primary base station 401 by the base station controller 431 along with those other base stations which are to be placed in the mobile station's active set. Accordingly, the base station controller interface 404 receives these designations and establishes the contents of the mobile station's active set within the variable active set controller 405. Similar to the present day system 300 of FIG. 3, the base station 401 according to the present invention has a variable active set controller 405 that maintains the contents of a plurality of active sets which correspond to a plurality of mobile stations within the base station's coverage area, as designated by the base station controller 431.

Accordingly, the base station 401 communicates the base stations for the active set corresponding to the mobile station 431 over the forward link by one or more forward link messages 422. In a CDMA2000 system, this information is passed to the mobile station 411 via a channel assignment message. Subsequent updates to the content of the active set are sent using handoff direction messages.

The mobile station 411 receives these messages 422 over the forward link and the mobile station receiver 412 provides the active set information to the variable active set registry 415. As subsequent traffic is received, the receiver 412 accesses the variable active set registry 415 for purposes of measuring pilot signal strength in order to request that base stations be added or dropped from the active set, and for purposes of combining traffic signals within the receiver 412 to achieve macro diversity combining.

Processed traffic and signal strengths are provided to the message processor 414, which generates data to be transmitted to the primary base station 401. The message processor 414 accesses the variable active set registry 415 as well to correlate data received from the receiver 412 with the base stations in the active set, and also to format acknowledgements, traffic, requests to reduce the size of the active set, and requests to add/drop base stations from the active set for transmission to the primary base station 401. The transmitter 413 formats and transmits the reverse link messages 421 to the primary base station 401 using the information contained in the active set registry 415. As alluded to above, when it is determined that a base station should be dropped from the active set by signal strength measurements made in the receiver 412 (e.g., signal strength falls below T-DROP for a period of time defined by protocol), then the message processor 414 queues up reverse link messages 421 for transmission to the base station 401 requesting that designated base stations be added or dropped from the active list. In addition, when the mobile station 411 determines that the size of the active set should be reduced in order to more efficiently utilize both receiver and processing capabilities, then the message processor 414 queues up reverse link messages 421 for transmission to the base station 401 requesting that the size of the active set be changed. In one embodiment, the same reverse link message 421 is employed to change the active set size as is currently used to report pilot signal strength. In a CDMA2000 embodiment, the PSMM message is employed with the addition of a 2-bit field to indicate desired active set size. In one embodiment, the PSMM contain REF_PN, REF_PN_PHASE and PILOT_STENGTH signals.

The primary base station 401 receives the messages 421 requesting modification of the active set for the mobile station 411, and in coordination with the other base stations (via the base station controller 431), the active set is changed within the variable active set controller 405 and forward link messages 422 are transmitted to the mobile station 411 directing the mobile station 411 to modify the contents of its active set registry 415 to change the size and/or to add/drop base stations or to perform a handoff. In one embodiment, the base station 401, in coordination with the base station controller 431, determines the active set size and contents within the active set, as requested by the mobile station 411. In an alternative embodiment, via the reverse link messages 421, the mobile station 411 determines the size of the active set and, responsive to this direction, the base station 401 modifies the size of the active set within the variable active set controller 404. The base station, then, in coordination with the base station controller 431, determines contents of the active set, as requested by the mobile station 411, and according to the size specified by the mobile station 411.

Advantageously, the system 400 according to the present invention provides for an increase in user capacity under conditions when the mobile station 411 requests (or directs) a reduction in active set size. This is because there will be fewer base stations transmitting to the mobile station 411 than would otherwise be transmitting, which results in a reduction in channel response fluctuation and reduced interference between cells.

Figure 5:
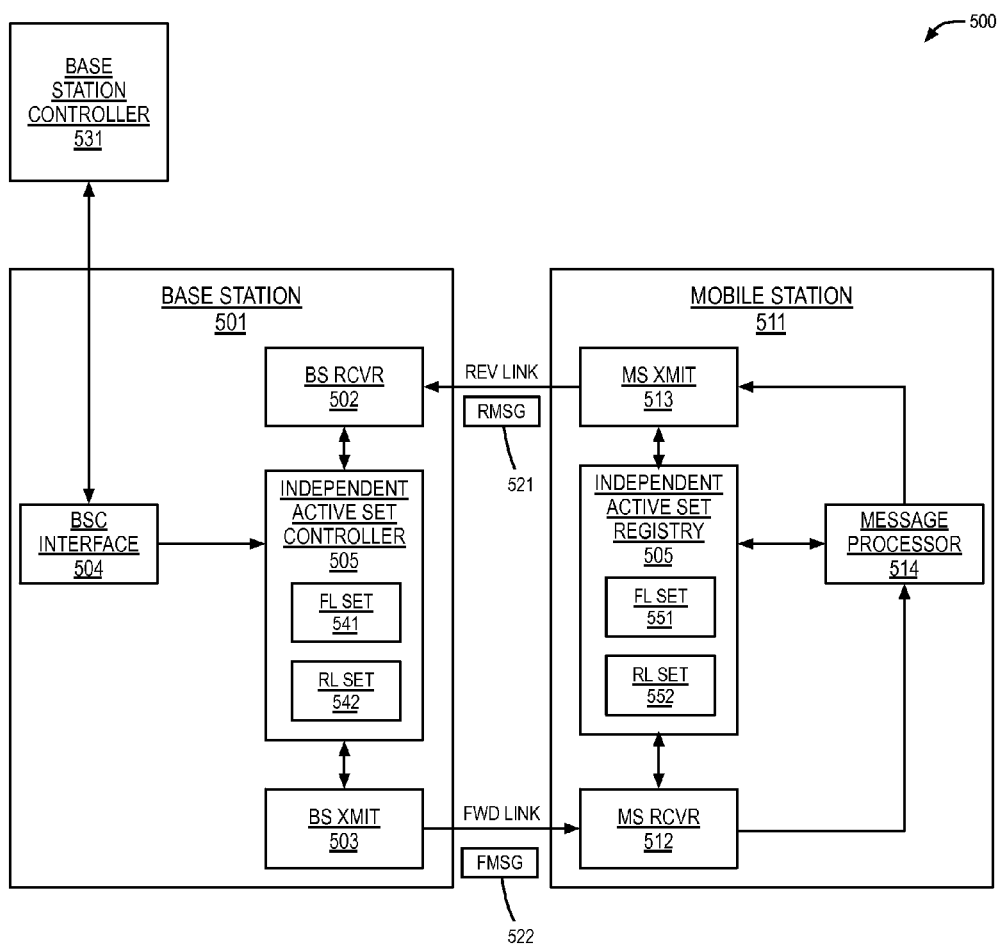
FIG. 5 is a block diagram depicting a wireless communication system according to the present invention that employs independent active set management.

Referring now to FIG. 5, a block diagram is presented depicting a wireless communication system 500 according to the present invention that employs independent active set management. The system 500 includes a base station controller 531 that is coupled to a primary base station 501. The primary base station 501 is coupled to a mobile station 511 via both a wireless forward link over which is transferred forward link messages 522 from the base station 501 to the mobile station 511, and a wireless reverse link over which is transferred reverse link messages 521 from the mobile station 511 to the base station 501. As one skilled in the art will appreciate, the system 500 of FIG. 5 is simplified for clarity purposes in order to teach significant aspects of the present invention. In addition, for clarity purposes, only the primary base station 501 is depicted, however, it is noted that signals are being transmitted to the mobile station 511 by other base stations (not shown) within the mobile station's active set, as is described above, where the signals from these other base stations may exhibit SNRs which are advantageous or detrimental to reception and soft handoff in keeping with the processing capabilities of the mobile station 511.

The base station 501 includes a base station controller interface 504, which is coupled to an independent active set controller 505. The independent active set controller 505 has a forward link active set 541 and a reverse link active set 542, which are both associated with the mobile station 511. The base station 501 also includes a base station receiver 502 that is coupled to the reverse link for reception of reverse link messages 521 and that is also coupled to the independent active set controller 505. The base station 501 additionally has a base station transmitter 503 that is coupled to the independent active set controller 505 and that transmits forward link messages 522 over the forward link.

The mobile station 511 has a mobile station receiver 512 that receives forward link messages 522 over the forward link. The mobile station receiver 512 is coupled to an independent active set registry 515 and to a message processor 512 within the mobile station 511. The independent active set registry 515 includes a forward link active set 551 and a reverse link active set 552, which contain the same entries as those within the respective sets 541, 542 in the base station 501. The message processor 514 is coupled to the independent active set registry 515 and to a mobile station transmitter 513, which transmits reverse link messages 521 over the reverse link to the base station 501.

In operation, the forward link active sets 541, 551 contain entries for the base stations, including base station 501, which is assigned to transmit traffic and pilot signals to the mobile station 511 to direct the soft handoff of the Forward Traffic Channels. When the mobile station 511 is first assigned Forward Traffic Channels, the mobile station 511 shall initialize the Forward Link Active Set to contain the pilots associated with the assigned Forward Traffic Channels. When the mobile station 511 processes an Extended Handoff Direction Message, a General Handoff Direction Message or Universal Handoff Direction Message, then at the action time of the message the mobile station shall replace the pilots in the Forward Link Active Set with the pilots listed in the message. If the call rescue allowed timer is enabled, then the mobile station shall autonomously add one or more Candidate Set pilots whose strength exceeds T_ADDs to the Forward Link Active Set, beginning with the strongest, provided that:

the NGHBR_RESQ_CONFIGURED field of the NGHBR_REC for the corresponding pilot is equal to '1', and the resulting Forward Link Active Set size does not exceed N6m pilots.

When autonomously adding Rescue Channel pilots to the Forward Link Active Set, the mobile station may autonomously drop one or more of the existing pilots in the Forward Link Active Set, beginning with the weakest, to allow for adding pilots when the Forward Link Active Set is full.

When the mobile station is first assigned Forward Traffic Channels, the base station shall also initialize the Reverse Link Active Set to contain the pilots associated with the assigned Forward Traffic Channels.

The base station may update the Reverse Link Active Set based on the pilot strength reports from the mobile stations, when the base station receives the following messages from the mobile stations:
Pilot Strength Measurement Message or Extended Pilot Strength Measurement Message
Handoff Completion Message or Extended Handoff Completion Message
Candidate Frequency Search Report Message
Periodic Pilot Strength Measurement Message
Pilot Strength Measurement Mini Message The mobile can report the desired active set size with this new RECOMMEND$_{13}$ ACTIVE_SET_SIZE information record in one of the following messages
Device Information Message
Flash with Information Message
Extended Flash with Information Message
Status Message
Status Response Message
Extended Status Response Message The reverse link active sets 542, 552 contain entries for the base stations which are actively decoding traffic sent by the mobile station 511 over the reverse link. In one embodiment, the reverse link active sets 542, 552 have a maximum size of six, as in a present day CDMA2000 environment and the size of the forward link active sets 541, 551 are varied as in the embodiment of FIG. 4 according to the capabilities of the mobile station 511.

When the base station controller 531 originally assigns a forward traffic channel to the mobile station 511, a particular base station 501 is assigned as the primary base station 511 and this information is communicated to the primary base station 501 by the base station controller 531 along with those other base stations which are to be placed in the mobile station's forward link active set 551 and reverse link active set 552. Accordingly, the base station controller interface 504 receives these designations and establishes the contents of the active sets 541, 542 within the independent active set controller 505. Like the system 400 of FIG. 4, the base station 501 has an independent active set controller 505 that maintains the contents of a plurality of active sets 541, 542 which correspond to a plurality of mobile stations within the base station's coverage area, as designated by the base station controller 531.

Accordingly, the base station 501 communicates the base stations for the active sets 541, 542 corresponding to the mobile station 531 over the forward link by one or more forward link messages 522. In a CDMA2000 system, this information is passed to the mobile station 511 via a channel assignment message. Subsequent updates to the content of the active sets 551, 552 are sent using handoff direction messages.

The mobile station 511 receives these messages 522 over the forward link and the mobile station receiver 512 provides the active set information to the active sets 551, 552 within the independent active set registry 515. As subsequent traffic is received, the receiver 512 accesses the independent active set registry 515 for purposes of measuring pilot signal strength in order to request that base stations be added or dropped from the active sets 551, 552, and for purposes of combining traffic signals within the receiver 512 to achieve macro diversity combining.

Processed traffic and signal strengths are provided to the message processor 514, which generates data to be transmitted to the primary base station 501. The message processor 514 accesses the independent active set registry 515 as well to correlate data received from the receiver 512 with the base stations in the active sets 551, 552, and also to format acknowledgements, traffic, requests to reduce the size of the forward link active set 551, and requests to add/drop base stations from the forward link active set 551 for transmission to the primary base station 501. The transmitter 513 formats and transmits the reverse link messages 521 to the primary base station 501 using the information contained in the active set registry 515. As alluded to above, when it is determined that a base station should be dropped from the forward link active set 551 by signal strength measurements made in the receiver 512 (e.g., signal strength falls below T-DROP for a period of time defined by protocol), then the message processor 514 queues up reverse link messages 521 for transmission to the base station 501 requesting that designated base stations be added or dropped from the forward link active set 551. In addition, when the mobile station 511 determines that the size of the forward link active set 551 should be reduced in order to more efficiently utilize both receiver and processing capabilities, then the message processor 514 queues up reverse link messages 521 for transmission to the base station 501 directing that the size of the forward link active set 541, 551 be changed. In one embodiment, the same reverse link message 521 is employed to change the forward link active set size as is currently used to report pilot signal strength. In a CDMA2000 embodiment, the PSMM message is employed with the addition of a 2-bit or a 3-bit field to indicate the size. In one embodiment, the 2-bit or 3-bit may be used in the page response, the pilot strength measurement message and handoff message, etc.

The primary base station 501 receives the messages 521 directing modification of the forward link active set size and contents, and in coordination with the other base stations (via the base station controller 531), the forward link active set 541 is changed within the independent active set controller 505. In one embodiment, via the reverse link messages 521, the mobile station 511 determines the size of the forward link active sets 541, 551 in addition to the particular base stations therein and, responsive to this direction, the base station 501 modifies the size of the forward link active set 541 within the independent active set controller 504. According to the system 500 of FIG. 5, the base station 501 determines the contents of the reverse link active sets 542, 552 based upon pilot signal strength measurement messages 521 provided by the mobile station.

Figure 6:
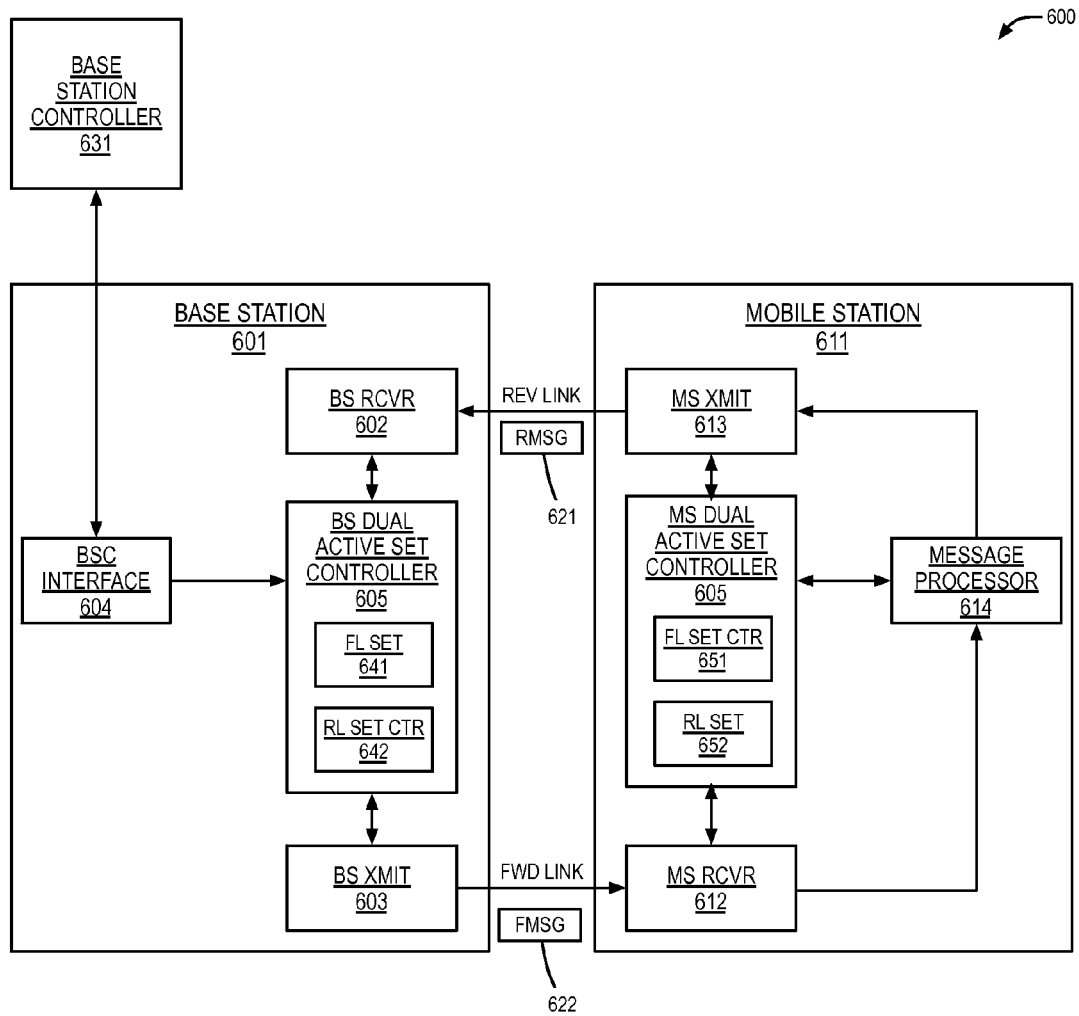
FIG. 6 is a block diagram detailing a wireless communication system according to the present invention that employs dual active set management.

Turning now to FIG. 6, a block diagram is presented detailing a wireless communication system 600 according to the present invention that employs dual active set management. The system 600 includes a base station controller 631 that is coupled to a primary base station 601. The primary base station 601 is coupled to a mobile station 611 via both a wireless forward link over which is transferred forward link messages 622 from the base station 601 to the mobile station 611, and a wireless reverse link over which is transferred reverse link messages 621 from the mobile station 611 to the base station 601. As one skilled in the art will appreciate, the system 600 of FIG. 6 is simplified for clarity purposes in order to teach significant aspects of the present invention. In addition, for clarity purposes, only the primary base station 601 is depicted, however, it is noted that signals are being transmitted to the mobile station 611 by other base stations (not shown) within the mobile station's active set, as is described above, where the signals from these other base stations may exhibit SNRs which are advantageous or detrimental to reception and soft handoff in keeping with the processing capabilities of the mobile station 611.

The base station 601 includes a base station controller interface 604, which is coupled to a dual active set controller 605. The dual active set controller 605 has a forward link active set 641 and a reverse link active set 642, which are both associated with the mobile station 611. The base station 601 also includes a base station receiver 602 that is coupled to the reverse link for reception of reverse link messages 621 and that is also coupled to the dual active set controller 605. The base station 601 additionally has a base station transmitter 603 that is coupled to the dual active set controller 605 and that transmits forward link messages 622 over the forward link.

The mobile station 611 has a mobile station receiver 612 that receives forward link messages 622 over the forward link. The mobile station receiver 612 is coupled to a dual active set registry 615 and to a message processor 612 within the mobile station 611. The dual active set registry 615 includes a forward link active set 651 and a reverse link active set 652, which contain the same entries as those within the respective sets 641, 642 in the base station 601. The message processor 614 is coupled to the dual active set registry 615 and to a mobile station transmitter 613, which transmits reverse link messages 621 over the reverse link to the base station 601.

In operation, the forward link active sets 641, 651 contain entries for the base stations, including base station 601, which are assigned to transmit traffic and pilot signals to the mobile station 611. The reverse link active sets 642, 652 contain entries for the base stations which are actively decoding traffic sent by the mobile station 611 over the reverse link. In one embodiment, the forward link active sets 641, 651 and reverse link active sets 642, 652 have a maximum size of six and their respective sizes are varied according to the capabilities of the mobile station 611 and the base station 601, as will be further descried below.

When the base station controller 631 originally assigns a forward traffic channel to the mobile station 611, a particular base station 601 is assigned as the primary base station 611 and this information is communicated to the primary base station 601 by the base station controller 631 along with those other base stations which are to be placed in the mobile station's forward link active set 651 and reverse link active set 652. Accordingly, the base station controller interface 604 receives these designations and establishes the contents of the active sets 641, 642 within the dual active set controller 605. Like the system 400 of FIG. 4, the base station 601 has a dual active set controller 605 that maintains the contents of a plurality of active sets 641, 642 which correspond to a plurality of mobile stations within the base station's coverage area, as designated by the base station controller 631.

Accordingly, the base station 601 communicates the base stations for the active sets 641, 642 corresponding to the mobile station 631 over the forward link by one or more forward link messages 622. In a CDMA2000 system, this information is passed to the mobile station 611 via a channel assignment message. Subsequent updates to the content of the active sets 651, 652 are sent using handoff direction messages.

The mobile station 611 receives these messages 622 over the forward link and the mobile station receiver 612 provides the active set information to the active sets 651, 652 within the dual active set registry 615. As subsequent traffic is received, the receiver 612 accesses the dual active set registry 615 for purposes of measuring pilot signal strength in order to request that base stations be added or dropped from the active sets 651, 652, and for purposes of combining traffic signals within the receiver 612 to achieve macro diversity combining.

Processed traffic and signal strengths are provided to the message processor 614, which generates data to be transmitted to the primary base station 601. The message processor 614 accesses the dual active set registry 615 as well to correlate data received from the receiver 612 with the base stations in the active sets 651, 652, and also to format acknowledgements, traffic, requests to reduce the size of the forward link active set 651, and requests to add/drop base stations from the forward link active set 651 for transmission to the primary base station 601. The transmitter 613 formats and transmits the reverse link messages 621 to the primary base station 601 using the information contained in the active set registry 615. As alluded to above, when it is determined that a base station should be dropped from the forward link active set 651 by signal strength measurements made in the receiver 612 (e.g., signal strength falls below T-DROP for a period of time defined by protocol), then the message processor 614 queues up reverse link messages 621 for transmission to the base station 601 requesting that designated base stations be added or dropped from the forward link active set 651. In addition, when the mobile station 611 determines that the size of the forward link active set 651 should be reduced in order to more efficiently utilize both receiver and processing capabilities, then the message processor 614 queues up reverse link messages 621 for transmission to the base station 601 directing that the size of the forward link active set 641, 651 be changed. In one embodiment, the same reverse link message 621 is employed to change the forward link active set size as is currently used to report pilot signal strength. In a CDMA2000 embodiment, the PSMM message is employed with the addition of a 2-bit or a 3-bit field to indicate the size. In one embodiment, the mobile station 611 determines the size and contents of the forward link active sets 641, 651 and communicates this information to the base station 601 via messages 621 over the reverse link.

The primary base station 601 receives the messages 621 directing modification of the forward link active set size and contents, and in coordination with the other base stations (via the base station controller 631), the forward link active set 641 is changed within the dual active set controller 605.

According to the system 600 of FIG. 6, the base station 601 determines the size and contents of the reverse link active sets 642, 652 based upon pilot signal strength measurement messages 621 provided by the mobile station 611.

In the embodiments of FIGS. 5 and 6, the forward link active sets 541, 551, 641, 651 are utilized to achieve optimum reception through macro diversity combining to provide for soft handoff operations. The reverse link active sets 542, 552, 642, 652 are maintained by the base station 501, 602 in coordination with the base station controller 531, 631 to achieve macro diversity over the reverse link. The mobile station 511, 611 retains copies of the reverse link active set 552, 652 to allow for proper tracking and demodulation of power control and acknowledge information from the base station 501, 601 and to enable frame early termination.

Figure 7:
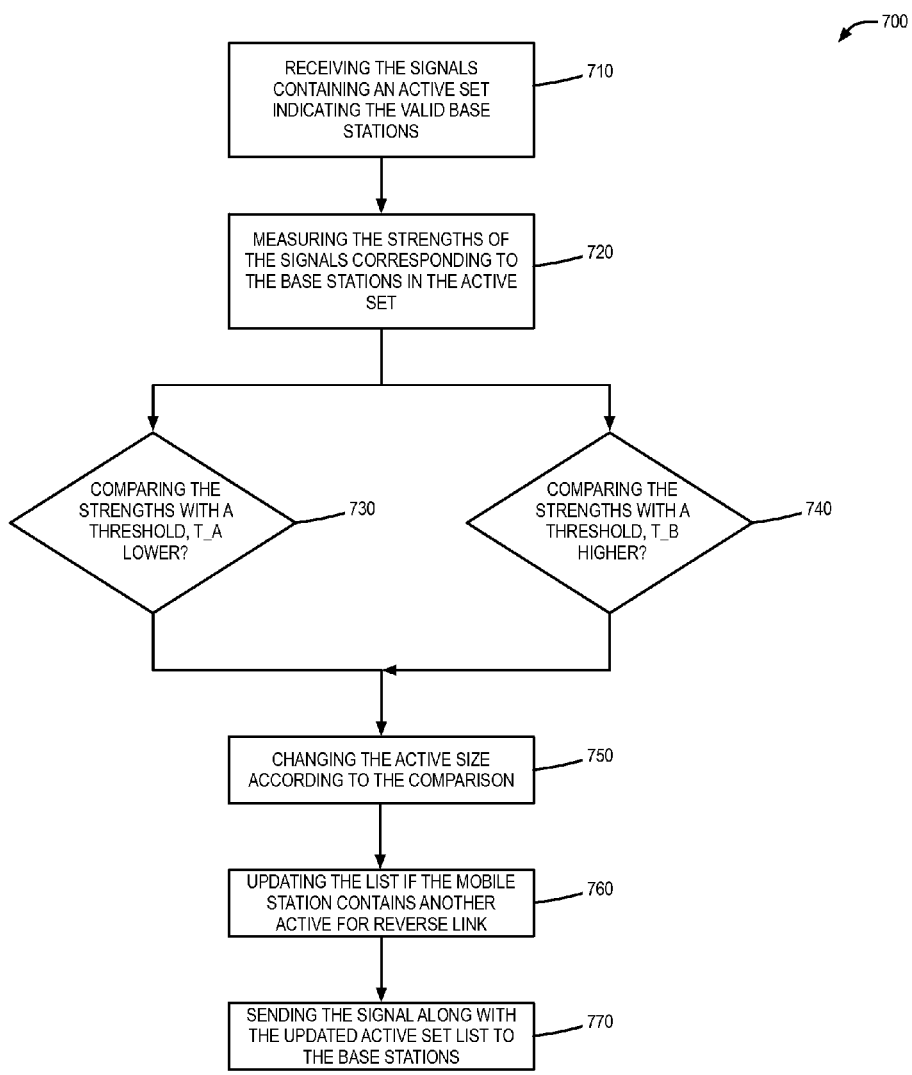
FIG. 7 is a flow chart detailing the method for a mobile station to change the active set according to one embodiment of the present invention.

Referring to FIG. 7, a flow of adding pilot into Active set is shown, in step 710, the mobile station received the signals which contains an active set indicating the valid base stations. In step 720, the active set controller in mobile station received the active set and measures the strengths of the signals corresponding to the base stations in the active set. In other embodiments, the active set controller may be replaced by the independent active set controller, dual active set controller and variable active set controller. The strength could be weighed by SNR and other power level which could be comprehended by the ordinary people. In step 730, if the strength is below a threshold, such as T_A, then the corresponding base station will be disconnect with the mobile station, and the record will be deleted. In step 740, if one base station which is not shown in the active set, but the strength is big enough to beyond another threshold, such as T_B, then the active set list will be updated and add the base station in. Apparently, the add in threshold T_B is higher than the drop threshold T_A. In step 750, what ever drop or add, the active size need to be changed, much different with the prior art which the active set is fixed. In step 760, in one embodiment, the mobile station contains another set for reverse link which is used to connect and send signal according to the updated list. If there is only one active set for receiver and transmitter, the step 760 could be omitted. In step 770, the transmitter will send the signal along with the updated active set list to the base station. In another embodiment, the base stations are connected with a base station controller, the BS controller will notify the updated list instead of the particular base station.

For the above embodiments, the invention may also include a scheme for call rescue soft handoff. When the call rescue feature is enabled by one of the base stations and the base station detects that a mobile station having MOB_P_REV (mobile station_protocol_revision) greater than seven has disabled its transmitters, then the base station shall initiate call rescue procedures.

The base station which is configured with a Rescue Channel shall allocate a Walsh Code for the Rescue Channel. If the base station is designated as a rescue cell candidate, then the base station shall monitor the Reverse Traffic Channel in order to acquire a mobile station attempting call rescue soft handoff. If the base station acquires the mobile station, then it should begin immediately transmitting to the mobile station using the Rescue Channel Walsh Code.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A mobile station wirelessly communicating with a plurality of base stations, the mobile station comprising:
   a receiver, configured to receive a plurality of signals from the plurality of base stations;
   a message processor, configured to determine a first active set of the plurality of base stations, wherein the message processor determines a maximum size of the first active set and which base station is selected into the first active set according to a measurement of the plurality of signals, and wherein the maximum size of the first active set is variable according to the mobile station and the plurality of base stations, and wherein the message processor queues up one or more messages to set the maximum size of the first active set; and
   a transmitter, configured to transmit the one or more messages to a primary base station of the first active set.

2. The mobile station as recited in claim 1, wherein the mobile station sends a call rescue request which is monitored and acquired by one of the base stations, in response to the base station being selected by the mobile station into the first active set without the measurement.

3. The mobile station as recited in claim 1 wherein said one or more messages are transmitted through any combination of the following group:
   Page Response;
   Pilot Strength Measurement Message; and
   Handoff Completion Message.

4. The mobile station as recited in claim 1, wherein the plurality of base stations are coupled to a controller, which further comprises a second active set of the plurality of base stations, the status of the base station in the second active set being updated by the controller according to the one or more messages from the plurality of base stations.

5. The mobile station as recited in claim 4, wherein the controller directs the base station not in the second active set to disconnect with the mobile station and directs the base station in the second active set to communicate with the mobile station with macro diversity gain calculated by the controller.

6. The mobile station as recited in claim 4, wherein the status of the second active set is recorded in the following group:
   Device Information Message;
   Flash with Information Message;
   Status Message; and
   Status Response Message.

7. The mobile station as recited in claim 1, wherein the message processor further performs:
   when the strength of signals is below a first threshold, drop the corresponding base station and decrease the maximum size of the first active set; and
   when the strength of signals is beyond a second threshold, add the corresponding base station and increase the maximum size of the first active set.

8. The first device as recited in claim 7, wherein the first threshold and the second threshold is determined according to the wireless communication capability and condition.

9. A method for a mobile station wirelessly communicating with a plurality of base stations, the method comprising:
   receiving a plurality of signals from the plurality of base stations;
   determining a maximum size of a first active set of the plurality of base stations and which base station is selected into the first active set according to a measurement, wherein the maximum size of the first active set is variable according to the mobile station and the plurality of base stations, and wherein one or more messages are queued up to set the maximum size of the first active set; and
   transmitting the one or more messages to the primary base station of the first active set.

10. The method as recited in claim 9, wherein the mobile station sends a call rescue request which is monitored and acquired by one of the base stations, in response to the base station being selected by the mobile station into the first active set without the measurement.

11. The method as recited in claim 9 wherein said one or more messages are transmitted through any combination of the following group:
   Page Response;
   Pilot Strength Measurement Message; and
   Handoff Completion Message.

12. The method as recited in claim 9, wherein the plurality of base stations are coupled to a controller, which further comprises a second active set of the plurality of base stations, the status of the base station in the second active set being updated by the controller according to the one or more messages from the plurality of base stations.

13. The method as recited in claim 12, wherein the method further comprises directing the base station not in the second active set to disconnect with the mobile station and directing the base station in the second active set to communicate with the mobile devices with macro diversity gain calculated by the controller.

14. The method as recited in claim 13, wherein the status of the second active set is recorded in the following group:
   Device Information Message;
   Flash with Information Message;
   Status Message; and
   Status Response Message.

15. The method as recited in claim 9, wherein the message processor further performs:
   when the strength of signals is below a first threshold, drop the corresponding base station and decrease the maximum size of the first active set; and
   when the strength of signals is beyond a second threshold, add the corresponding base station and increase the maximum size of the first active set.

16. The method as recited in claim 15, wherein the first threshold and the second threshold is determined according to the wireless communication capability and condition.

17. A system, comprising:
   a plurality of base stations for transmitting a plurality of signals; and
   a mobile station communicating with the plurality of base stations, the mobile station further comprising:
   a receiver, configured to receive the plurality of signals from the plurality of base stations;
   a message processor, configured to determine a first active set of the plurality of base stations, wherein the message processor determines a maximum size of the first active set and which base station is selected into the first active set according to the measurement, and wherein the maximum size of the first active set is variable, and wherein one or more messages are queued up to set the maximum size of the first active set; and
   a transmitter, configured to transmit the one or more messages to the base station of the first active set.

18. The mobile station as recited in claim 1, wherein the maximum size and a content of the first active set is modified by the mobile station.

19. The method as recited in claim 9, wherein the maximum size and a content of the first active set is modified by the mobile station.

* * * * *